United States Patent
Moehnke et al.

[11] Patent Number: 5,937,551
[45] Date of Patent: Aug. 17, 1999

[54] LOCK SYSTEM FOR EXCAVATING TOOTH POINT AND ADAPTER

[75] Inventors: Michael D. Moehnke, Forest Grove; Bruce C. Johnson, Portland, both of Oreg.

[73] Assignee: Columbia Steel Casting Co., Inc., Portland, Oreg.

[21] Appl. No.: 08/965,743

[22] Filed: Nov. 7, 1997

[51] Int. Cl.⁶ .................................................. E02F 9/28
[52] U.S. Cl. ............................ 37/459; 37/456; 37/458
[58] Field of Search ........................ 37/450, 452, 453, 37/455, 456, 457, 458, 459, 460, 446

[56] References Cited

U.S. PATENT DOCUMENTS

| | | | |
|---|---|---|---|
| 1,808,311 | 6/1931 | Madonna . | |
| 1,834,514 | 12/1931 | Brune . | |
| 1,874,783 | 8/1932 | Mekeel . | |
| 2,688,475 | 9/1954 | Small | 262/8 |
| 2,846,790 | 8/1958 | Davis et al. | 37/142 |
| 3,197,894 | 8/1965 | Ratkowski | 37/142 |
| 3,358,569 | 12/1967 | Averette | 94/50 |
| 3,601,911 | 8/1971 | Wood | 37/142 R |
| 3,650,053 | 3/1972 | Baer | 37/142 |
| 3,722,932 | 3/1973 | Dougall | 287/103 D |
| 3,733,722 | 5/1973 | Launder | 37/142 A |
| 3,792,735 | 2/1974 | Radigan | 172/753 |
| 3,864,853 | 2/1975 | Klett et al. | 37/141 T |
| 3,952,433 | 4/1976 | Heinold et al. | 37/142 A |
| 4,326,348 | 4/1982 | Emrich | 37/142 R |
| 4,338,736 | 7/1982 | Radigan | 37/142 A |
| 4,716,668 | 1/1988 | Hahn | 37/142 A |
| 4,727,663 | 3/1988 | Hahn | 37/142 A |
| 4,823,486 | 4/1989 | Diekevers et al. | 37/142 R |
| 4,848,013 | 7/1989 | Bowman et al. | 37/142 A |
| 4,918,843 | 4/1990 | Kiesewetter et al. | 37/142 A |
| 5,009,017 | 4/1991 | Diekevers et al. | 37/142 A |
| 5,068,986 | 12/1991 | Jones | 37/142 A |
| 5,172,500 | 12/1992 | Renski et al. | 37/142 A |
| 5,205,057 | 4/1993 | Garman | 37/458 |
| 5,337,495 | 8/1994 | Pippins | 37/453 |
| 5,561,925 | 10/1996 | Livesay | 37/455 |

FOREIGN PATENT DOCUMENTS

| | | | |
|---|---|---|---|
| 641404 | 5/1962 | Canada | 37/112 |
| 729862 | 3/1966 | Canada | 37/112 |
| 565417 | 11/1944 | United Kingdom | 37/142 |

*Primary Examiner*—Thomas B. Will
*Assistant Examiner*—Robert Pezzuto
*Attorney, Agent, or Firm*—Klarquist Sparkman Campbell Leigh & Whinston, LLP

[57] ABSTRACT

A lock system removably connects an earthengaging tooth point to an adapter. The lock system is particularly suited to tooth points for large excavating buckets, such as dragline buckets. The forward-extending nose of the adapter fits within the rear-facing socket of the tooth point. Ears extend back from the tooth point on both sides of the adapter and define apertures adapted to receive pins. A hole in the adapter is also adapted to receive the pins. The pins extend through the apertures and into the hole, thus fixedly connecting the tooth point to the adapter. To remove the tooth point, both pins can be driven into the adapter hole and housed there concurrently. The tooth point can then be removed and the pins later driven out of the hole.

17 Claims, 2 Drawing Sheets

LOCK SYSTEM FOR EXCAVATING TOOTH POINT AND ADAPTER

FIELD OF THE INVENTION

This invention relates to a locking arrangement or a tooth point for an excavating bucket, and more particularly to a locking arrangement that facilitates removal of a tooth for replacement.

BACKGROUND OF THE INVENTION

Removable tooth points have been used on excavating buckets and other earth moving equipment for many years. In that time several varying arrangements for retaining a tooth in place have emerged. Typically these designs attach tooth points to adapters, which in turn are attached to an excavating bucket or are otherwise secured to the earth moving device. The tooth points engage the earth to loosen it and allow the bucket to scoop it up for removal.

With large-scale excavating equipment, such as draglines, the tooth points of the bucket are subjected to substantial forces and frictional wear. Thus, tooth points wear down quickly, slowing excavation work because they cannot dig into the soil effectively, requiring greater force to do the same work and subjecting the entire excavating machine to greater stresses. In addition, without the loosening effect of the teeth, the bucket may suffer damage because of its engagement with unloosened material.

If the tooth points are replaced frequently, the excavating machine operates more efficiently. However, replacing tooth points can be a labor-intensive job, requiring costly down time for the excavating machine. Prior tooth point designs have attempted to reduce the amount of labor required to replace the points while still securely locking the tooth point to the adapter during operation. However, such designs have met with small degrees of success.

Some prior designs have used a locking pin extending vertically through the tooth point. However, in such designs, the heads of the pin are exposed to the main body of earth going into the bucket and to the earth below so that rocks often hit the heads of the pin causing deformation and dirt wedges between the pin and the receiving hole. Consequently, the pin is difficult to remove and much time is required to replace such tooth points.

Other designs have used pins that enter horizontally. However, such pins are generally difficult to replace because of the small space between teeth. Some designs have tried to remedy the problem by using two pins in the design. However, such designs still require the user to pound both pins through the width of the tooth point before removing the tooth. This is difficult because of the limited space between the teeth of the bucket.

BRIEF SUMMARY OF THE INVENTION

An object of the present invention is to provide a novel lock system for an excavating bucket tooth point which securely fastens the tooth point to the adapter, but allows the tooth point easily to be replaced.

More specifically, an object of the invention is to provide a system which includes a tooth point having a socket to receive the end of the adapter and apertures in the opposite side walls of this point adapted each to receive one of a pair of short locking pinS which extend into a pin receiving hole which extends through the adapter, and in which hole both pins can be wholly received. The locking pins are adapted to receive releasable locks or keepers to maintain them in locking position but which permit the locking pins to be driven into the hole in the adapter and out of engagement with the tooth point, and in which hole they are housed while the tooth point is removed. Unlocking of the pins is facilitated by unique cooperative construction of the pins and a removal tool.

DESCRIPTION OF PREFERRED EMBODIMENT

Figure 1:
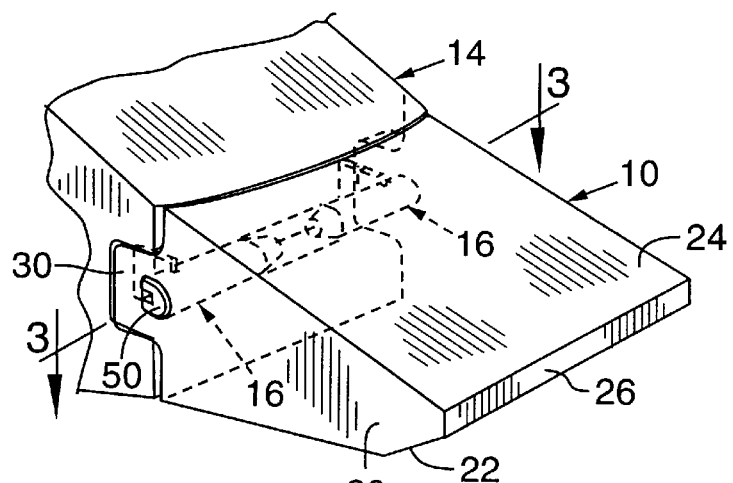
FIG. 1 is a perspective view of a preferred embodiment of the inventive lock system.
Figure 2:
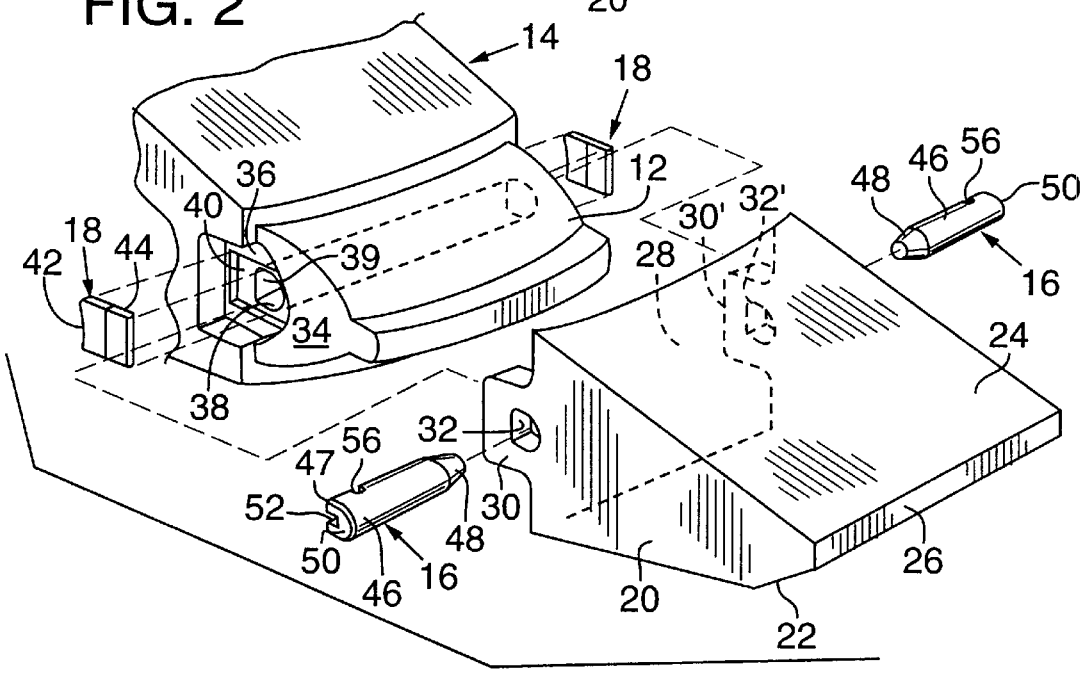
FIG. 2 is an exploded perspective view of the embodiment of FIG. 1.

FIGS. 1–2 illustrate a preferred embodiment of the present invention comprising a tooth point or earth-engaging member 10 mounted to the nose 12 of an adapter or driving member 14. The tooth point 10 is removably secured to the adapter nose 12 by the horizontally-extending locking pins 16 held in place by locks or keepers 18. As will be understood, a plurality of adapters will be mounted at regular intervals on the forward edge of the bottom of an excavating shovel or like earth moving apparatus.

Referring now to FIG. 2, the tooth point 10 has opposite side walls 20, 20', a bottom wall 22 and a top wall 24. The top wall 24 and the bottom wall 22 meet to form an horizontal front cutting edge 26 and diverge rearwardly to form a rear-facing socket 28. The side walls 20, 20' comprise ears 30, 30' which define apertures 32, 32', respectively, adapted to receive the horizontally extending pins 16, which are preferably of non=circular cross-section in the illustrated embodiment being D-shaped in cross-section.

The forward end of the adapter 14 forms a nose 12 that is shaped to fit cooperatively in the socket 28 in the tooth point 10. The nose 12 is inwardly offset on all sides from the general exterior surfaces of the adapter 14. The upper and lower surfaces of the nose 12 converge forwardly, ending in a full width, forwardly-extending horizontal projection. The side faces 34 of the nose 12 also converge forwardly and are formed with recesses 36 on each side of the adapter 14 near the rearward ends of the faces 34. The recesses 36 are adapted to receive the ears 30, 30' of the tooth point when the latter is mounted upon the adapter 14 (see FIG. 1).

Referring still to FIG. 2, a hole 38, centrally located within the recesses 36 and also preferably D-shaped in cross-section and adapted cooperatively to receive the pins 16, extends horizontally through the adapter 14, such that it is coaxial with the apertures 32 in the ears 30 when the nose 12 fits within the socket 28. The hole 38 is formed with a flat side 39 on the rearward side of the hole 38 (see FIG. 2). Channels or seats 40 in the surface of the recesses 36, adapted to receive locks or keepers 18, extend rearwardly from the hole 38.

Figure 6:
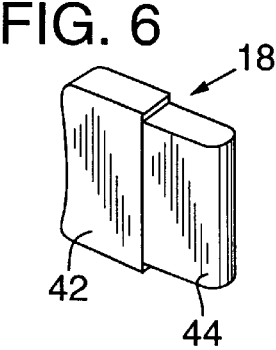
FIG. 6 is an enlarged perspective view of the lock or keeper used in a preferred embodiment of the inventive lock system.
Figure 7:
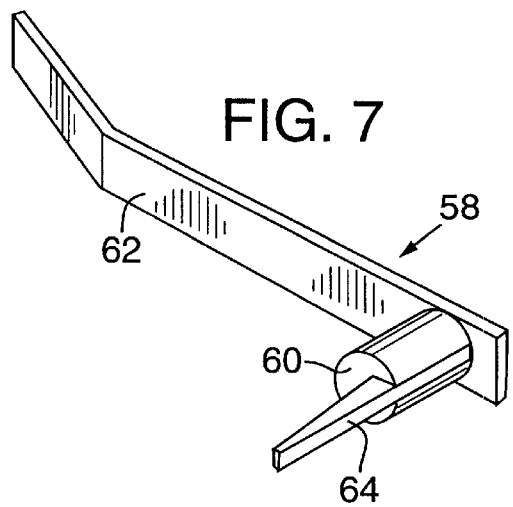
FIG. 7 is an enlarged perspective view of the removal tool used to disengage the lock or keeper from the locking pin.
Figure 4:
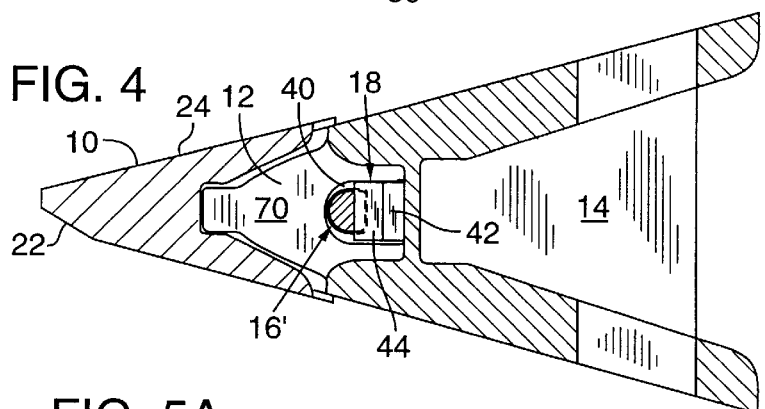
FIG. 4 is a sectional view taken line 4—4 of FIG. 3.

The pins 16 and hole 38 are sized so that the pins fit snugly, but not tightly within the hole 38. The keepers 18 have a resilient portion 42 formed of a suitable elastomer and a dowel or rigid portion 44 formed preferably of steel (see FIG. 6). The resilient portion 42 of the keepers 18 is seated rearwardly within the channel 40, adjacent the ear 30 of the tooth point 10. The dowels 44 extend forwardly, partially into the hole 38 (best seen in FIG. 4).

Each pin 16 has a body 46, preferably, as stated, having a D-shaped cross section defining a flat side 47, a tip 48 sloping inward to form a truncated cone, and a head 50. The pins 16 are preferably of equal length and the combined length of the pins is no greater than the length of the hole 38. A wedge-shaped removal slot or wedge receiving slot 52 extends axially along the flat side 47 of the body 46 of the pin 16 (see FIG. 5A). The wedge receiving slot 52 has a bottom surface 54 that slopes at a small acute angle of about 12° from substantially the axis of the pin 16 at the head 50 to the outer surface of the pin. A lock slot 56, adapted to receive the dowel 44, extends perpendicular to the pin axis on both sides of the wedge receiving slot 52.

Figure 3:
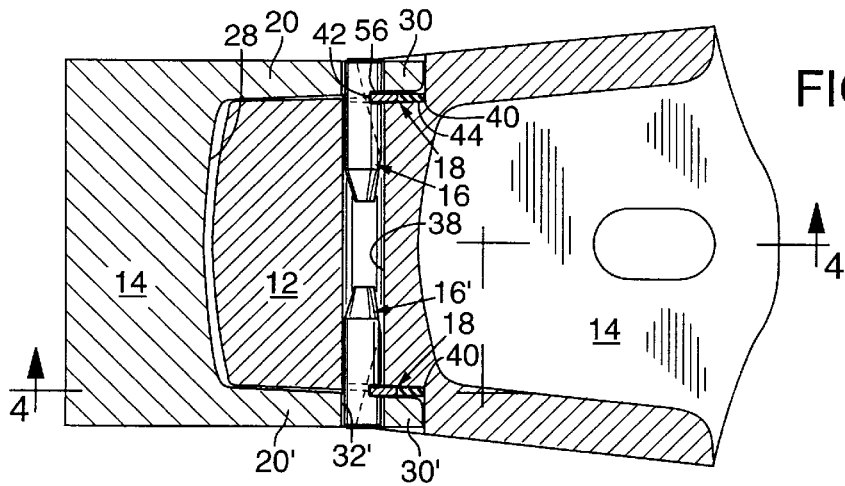
FIG. 3 is an enlarged sectional view taken along line 3—3 of FIG. 1.

Turning now to FIG. 3, in the mounted position of the point, the pins 16 extend through the apertures 32 in the ears 30 and into the hole 38. The keepers 18, disposed within the seats 40 and held in place by the ears 30, extend into the lock slots 56 of the pins 16. Thus, the keepers 18 hold the pins 16 in place and the pins 16 fixedly connect the tooth point 10 to the adapter 14. As will be apparent, the cooperating D-shape of the hole 38 and pins 16 aligns the slots 56 of the pins to receive the keepers 18.

A removal tool 58 has a D-shaped head 60 complimentary to the body 46 of the pins 16, a handle 62 extending radially from one end of the head 60 and a wedge 64 extending axially from the opposite end of the head 60. The wedge 64 is adapted to fit within the wedge receiving slots 52 in the pins 16, but is preferably of slightly lesser width than the slots 52 so that it may slide freely into a slot. The head 60 preferably has an axial length slightly greater than the thickness of the tooth point ears 30.

Referring back to FIG. 2, in assembling a tooth point 10 on an adapter 14, the keepers 18 are first inserted into the seats 40. The tooth point 10 is then mounted on the adapter nose 12. Each pin 16 is inserted into the respective aperture 32 in the ears 30, with the pin aligned so that the lock slot 56 is facing the keeper 18. The pin 16 is then driven with a small hammer through the aperture 32 and into the hole 38. As the pin 16 is driven, the tip 48 compresses the resilient portion 42 of the keeper 18, allowing the pin 16 to pass into the hole 38. When the lock slot 56 reaches the keeper 18, the keeper 18 springs into the lock slot 56, holding the pin 16 in place (see FIG. 3).

Disassembly is illustrated in FIGS. 5A-E. The removal tool 58 is rotated such that head 60 is coaxial with the pin 16 and the wedge 64 is aligned with the wedge receiving slot 52 (see FIG. 5A). The wedge 64 is inserted into the wedge receiving slot 52 until the edge of the wedge contacts the keeper 18 (see FIG. 5B). The removal tool 58 is then driven inwardly by striking the removal tool with a small hammer, such as, for example, a two pound ball peen hammer, forcing the wedge 64 into the wedge receiving slot 52 until the head 60 contacts the pin 16 and the wedge 64 simultaneously compresses the resilient portion of the keeper 18, disengaging it from the lock slot 56 (see FIG. 5C). The removal tool 58 is then further driven, forcing the pin 16 out of the aperture 32 in the ear 30 and into the hole 38 in the adapter 14 (see FIG. 5D). The removal tool 58 is then withdrawn and the process is repeated for the other pin 16.

Figure 5E:
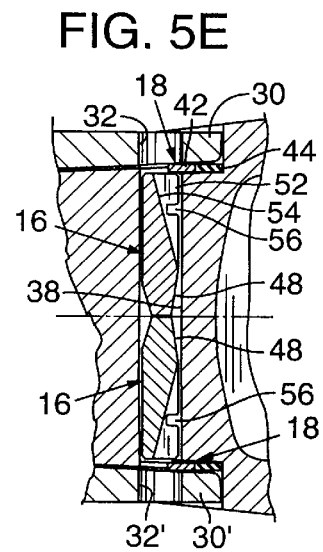
FIG. 5E is a view taken along line 3—3 of FIG. 4, showing both pins housed within the adapter hole.
Figures 5A, 5B, 5C, 5D:
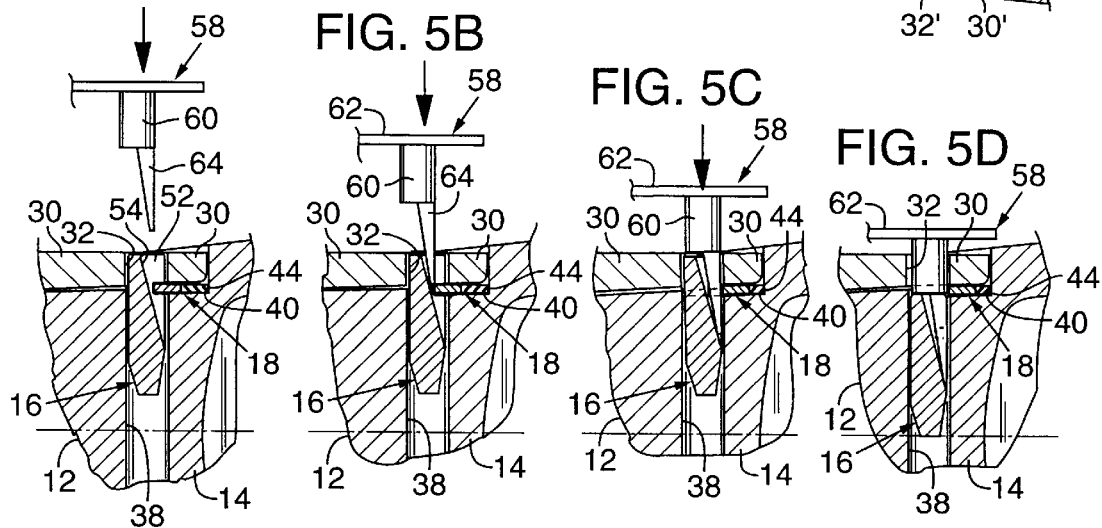
FIG. 5A is a fragmentary sectional view taken along 3—3 of FIG. 4 showing the position of a pin in locking position and of the removal tool before being inserted to disengage a keeper and allow removal of the pin.
FIG. 5B is a view similar to FIG. 5A, but showing the removal tool contacting the keeper.
FIG. 5C is a view similar to FIG. 5A, but showing the removal tool compressing the keeper to disengage it from the pin.
FIG. 5D is a view similar to FIG. 5A, but showing the position of the removal tool after it has driven the pin into the adapter hole and out of a tooth point ear.

The keepers 18 then hold both pins 16 within the hole 38, as shown in FIG. 5E. With both pins 16 housed in the hole 38 so they don't engage the ears 30, the tooth point 10 is removed. The keepers 18 are then removed and the pins 16 are easily driven out since their diameter is smaller than the diameter of the hole 38. A two pound hammer is sufficient to drive the removal tool 58, forcing the pins 16 into the hole 38 and to drive the pins 16 out of the hole after the tooth point 10 is removed.

Since the pins 16 are arranged horizontally, damage to the heads 50 of the pins 16 is minimized, making it easier to drive the pins into the hole 38 for disassembly. Further, the pins 16 can both be housed within the hole 38 at the same time, allowing the tooth point 10 to be removed before driving the pins 16 through the length of the hole 38. Thus, the tooth point 10 is securely locked to the adapter 14 and is easily removed with minimal space required between teeth.

Although the invention is described herein with reference to the preferred embodiment, it will be apparent to one skilled in the art that the invention permits of modification in arrangement and detail. For example, while the invention is illustrated with horizontally disposed locking pins and apertures and hole for receiving such pins, the invention may also be utilized with vertical disposition of the pins, apertures and hole. I claim all modifications as come within the spirit and scope of the appended claims.

I claim:

1. A lock system for locking a tooth point to an adapter adapted to be mounted on earth moving equipment, comprising an adapter having opposite top and bottom surfaces and opposite side surfaces, and a hole extending through the adapter between a pair of opposite surfaces;

a tooth point having a socket for cooperatively receiving said adapter defined by top, bottom and opposite side walls, said adapter hole being overlapped by a pair of opposite walls of said tooth point, said pair of opposite walls each having an aperture therein aligned with said hole;

a pair of locking pins extending one through each of said apertures and into said adapter hole fixing the tooth point to the adapter, the pins having a total length less than the length of said hole, such that both said pins can be driven from said tooth point and into said hole at the same time to allow removal of the tooth point; and a pair of keepers operatively arranged between said pins and said adapter for releasably retaining said pins in locking position with said pins engaged in said apertures and said hole.

2. The lock system of claim 1 wherein the adapter has a forward-extending nose.

3. The lock system of claim 2 wherein the tooth point has a rear-facing socket adapted to receive said forward-extending nose.

4. The lock system of claim 3 wherein said hole extends between said opposite side surfaces, and said apertures are defined by said pair of opposite side walls.

5. The lock system of claim 4 wherein said pins each includes a lock slot adapted to engage one of said keepers.

6. The lock system of claim 5 wherein said pins each further includes an axially-extending removal slot to provide access to the keepers.

7. The lock system of claim 5 wherein said pins and said hole are of cooperative non-circular cross-section such that the pins can only be driven into said apertures in the tooth point ears if the pins are positioned to receive said keepers.

8. The lock system of claim 5 wherein said keepers comprise a resilient portion adapted to engage said adapter or tooth point; and a rigid portion adapted to engage within the lock slot of a pin.

9. The lock system of claim 8 wherein a keeper is held in place between the adapter and a tooth point side wall.

10. The lock system of claim 6 further including a removal tool, said removal tool comprising a wedge adapted to fit within a removal slot and disengage the said keeper from the lock slot, a head attached to said wedge adapted to contact a said pin for driving it from the aperture in a tooth point side wall and fully into said hole in the adapter, and a handle attached to said head for aligning and withdrawing the removal tool.

11. A lock system for locking a replaceable earth-engaging member to a driving member, said driving member having a top, a bottom, and opposite side surfaces, and a horizontal hole extending between said side surfaces, said earth-engaging member defining a socket for receiving said driving member and being mounted on said driving member, said earth-engaging member having a pair of projections extending rearwardly one along each of said side surfaces of said driving member, said projections defining apertures axially aligned with said hole;

a pair of locking pins mounted one in each of said apertures in the said projections and extending into said hole in the driving member and fixing the earth-engaging member to the driving member, and keepers adapted to engage the pins and releasably hold them within said apertures and said hole, the pins being of total length less than that of said hole such that both pins can be driven from said apertures and housed within the hole at the same time to allow removal of the earth-engaging member from said driving member.

12. The lock system of claim 11 wherein said driving member is an adapter which is adapted to be fixedly connected to an excavating bucket.

13. The lock system of claim 11 wherein the earth-engaging member is a tooth point comprising sloped top and bottom walls and vertical side walls, the top and bottom walls meeting to form a front-facing cutting edge and diverging rearwardly to form a rear-facing socket, said projections extending rearwardly one from each of the side walls.

14. The lock system of claim 13 wherein said adapter includes a forward-extending nose adapted to fit within the rear-facing socket of said tooth point.

15. A lock system for locking a removable tooth point to an adapter on an earth moving device comprising a pair of keepers each comprising a resilient portion and a rigid portion;

a pair of locking pins each having a locking slot to receive the rigid portion of said keepers;

a removable tooth point having a forward facing earth-engaging edge, a rear-facing socket and ears extending rearwardly from either side of said socket defining horizontal apertures adapted to receive said locking pins; and an adapter connected to said earth moving device having a nose for extending into said rear-facing socket and defining a pair of seats for receiving the resilient portions of said keepers, said adapter having a horizontal hole therethrough coaxial with the apertures in the tooth point ears adapted to receive said locking pins, each locking pin being adapted to extend through one of said ears and into the hole in said adapter, the keepers releasably engaging the adapter and the locking pins for holding the locking pins in place, the hole in the adapter being of greater length than the total length of said locking pins such that both locking pins may be driven into said adapter hole at one time to permit removal of the tooth point from the adapter.

16. The lock system of claim 15 wherein the locking pins each has a locking slot in alignment with the associated keeper, and a removal slot for receiving a tool for engaging a keeper to disengage the same from a locking slot.

17. The lock system of claim 15 further including a removal tool with a wedge adapted to fit within said removal slot and engage the associated keeper to disengage the keeper from a locking pin as the wedge is driven into said slot whereby to allow the locking pin to be driven into the aperture in the adapter while the keeper is disengaged from the locking pin.

* * * * *